(12) United States Patent
Redi et al.

(10) Patent No.: US 6,973,039 B2
(45) Date of Patent: Dec. 6, 2005

(54) MECHANISM FOR PERFORMING ENERGY-BASED ROUTING IN WIRELESS NETWORKS

(75) Inventors: Jason Keith Redi, Somerville, MA (US); William Dugald Watson, Jr., Pepperell, MA (US); Mitchell Paul Tasman, Boston, MA (US)

(73) Assignee: BBNT Solutions LLC, Cambridge, MA (US)

( * ) Notice: Subject to any disclaimer, the term of this patent is extended or adjusted under 35 U.S.C. 154(b) by 900 days.

(21) Appl. No.: 09/733,364

(22) Filed: Dec. 8, 2000

(65) Prior Publication Data

US 2002/0071395 A1 Jun. 13, 2002

(51) Int. Cl.[7] .............................................. H04Q 7/34
(52) U.S. Cl. ..................................... 370/238; 455/522
(58) Field of Search ............................... 370/238, 248, 370/252, 311; 455/522

(56) References Cited

U.S. PATENT DOCUMENTS

| | | | |
|---|---|---|---|
| 4,718,002 A | 1/1988 | Carr ........................... 364/200 |
| 5,093,824 A | 3/1992 | Coan et al. .................... 370/16 |
| 5,243,592 A | 9/1993 | Perlman et al. ................ 370/17 |
| 5,850,592 A | 12/1998 | Ramanathan ................... 455/7 |
| 5,881,246 A | 3/1999 | Crawley et al. ........ 395/200.68 |
| 5,913,921 A | 6/1999 | Tosey et al. ................. 709/220 |
| 6,028,857 A | 2/2000 | Poor ........................... 370/351 |
| 6,735,448 B1 * | 5/2004 | Krishnamurthy et al. ... 455/522 |

OTHER PUBLICATIONS

Elbatt et al., 'Power Management for Throughput Enhancement in Wireless Ad-Hoc Networks', Communications, 2000, Jun. 18-22, 2000, pp. 1506-1513, vol. 3.*

"Link-State Routing," John Moy, Ch. 5, "Routing in Communications Networks," ed. Martha Steenstrup, Prentice Hall, 1995.
"Packet Radio Routing," Gregory S. Lauer, Ch. 11, "Routing in Communications Networks," ed. Martha Steenstrup, Prentice Hall, 1995.
"Packet Radio Network Routing Algorithms: A Survey," J.J. Hahn et al., IEEE Communications Magazine, vol. 22, No. 11, Nov. 1984, pp. 41-47.
"The Organization of Computer Resources into a Packet Radio Network," R.E. Kahn, IEEE Trans. On Communications, vol. COM-25, No. 1, Jan. 1977, pp. 169-178.
"Analysis of Routing Strategies for Packet Radio Networks," J.J. Garcia Lune Aceves et al., Proc. Of the IEEE INFOCOM '85, Washington, DC, Mar. 1985, 292-302.
"The DARPA Packet Radio Network Protocols," J. Jubin et al., Proc. Of the IEEE, vol. 75, No. 1, Jan. 1987, pp. 21-32.
Simon Haykin, "Adaptive Filter Theory," pp. 241-301 and pp. 562-588, Prentice Hall, 1996.

* cited by examiner

*Primary Examiner*—Melvin Marcelo
(74) *Attorney, Agent, or Firm*—Fish & Neave IP Group, Ropes & Gray LLP

(57) ABSTRACT

A method is provided to operate a communications node (2) in a network including a plurality of nodes. The communications node (2) includes a transceiver (6) to transmit and receive messages. The communications node (2) has at least one communications link with a first node of the plurality of nodes. The method includes the steps of: (i) determining path loss information across the at least one communications link by evaluating power data corresponding to a received signal from the first node; (ii) distributing the path loss information to the network; and (iii) routing messages to the network based on path loss information.

23 Claims, 12 Drawing Sheets

MECHANISM FOR PERFORMING ENERGY-BASED ROUTING IN WIRELESS NETWORKS

This invention was made with Government support under SPAWAR Contract No. N66001-99-C-8512, sponsored by Defense Advanced Research Projects Agency (DARPA). The Government has certain rights in this invention.

BACKGROUND OF THE INVENTION

1. Field of the Invention

The present invention relates generally to network communications, such as communications in wireless ad-hoc networks. More particularly, the present invention relates to a method, system and apparatus for energy-based routing in networks.

2. Background and Related Art

In wireless ad-hoc networks, all network nodes are preferably equipped with communications transceivers. At least some of these nodes are capable of network routing functions ("routers"); other nodes are sources or destinations for data traffic ("endpoints"). Preferably, all nodes in an ad-hoc network execute a set of known algorithms, and perform a set of known networking protocols. As will be appreciated by those skilled in the art, these algorithms and protocols enable the nodes to find each other, determine paths through the network for data traffic from source to destination(s), and detect and repair ruptures in the network as nodes move, as they fail, as battery power changes, as communications path characteristics change over time, and so forth. Wireless ad-hoc networks do not rely on immobile base stations or other fixed infrastructure. Accordingly, ad-hoc networks are important in military, emergency, mobile and temporary environments (e.g., business meetings, campaign headquarters, and so forth).

An example of an ad-hoc network 100 is shown in FIG. 1A. As illustrated, node X preferably routes packets between nodes W, Y and Z, for example. In this type of network, some network nodes are required to route packets for other nodes because transmission distance limitations often prevent full connectivity with all other nodes in the network. Typical radio transmission distances for these types of networks may be between a meter and hundreds of meters, for example. For communication to occur between any two nodes in a network, in environments that either span large areas or have significant radio propagation interference (such as in cities), nodes typically route packets on other nodes' behalf.

Other forms of ad-hoc wireless networks simplify routing and minimize routing traffic by organizing nodes (e.g., network members) into hierarchical groups called clusters, with each cluster having a cluster head. A cluster may include a single cluster head and zero or more cluster members. A cluster head serves as a router for affiliated cluster members. Cluster head stations communicate with each other to form a network backbone, and cluster member stations relay messages to the network through affiliated cluster heads. In mobile systems, cluster members move into and out of clusters depending on their physical location and radio connectivity. An example of this type of mobile communications network 110 is shown in FIG. 1B, in which areas 1A, 1B and 1C represent individual clusters. In FIG. 1B, a double-circle indicates a cluster head ("CH"), whereas a single circle indicates a cluster member ("CM"). In the FIG. 1B example, CM2 and CM3 are affiliated with a cluster headed by CH1, and CM6 and CM7 are affiliated with a cluster headed by CH5. CH4 is the head of its own cluster, and has zero cluster members.

Another example of a mobile communications network is disclosed in U.S. Pat. No. 5,850,592, issued to S. Ramanathan on Dec. 15, 1998. The U.S. Pat. No. 5,850,592 discloses a method for a plurality of mobile stations to automatically organize themselves into a hierarchical network, in which some of the stations operate as message gateways for a cluster of mobile stations. Initially, mobile stations search for available cluster heads and initiate an affiliation procedure to establish themselves as cluster members. If the affiliation procedure is successful, a mobile station operates as a cluster member. Otherwise, a mobile station promotes itself to operate as a cluster head.

In the arrangement of the U.S. Pat. No. 5,850,592, each station operates in at least two basic modes. In the first mode, the mobile station serves as a message gateway or router for a cluster of other member stations. The second mode allows the mobile station to operate as a non-gateway (or "cluster member") station. Each mobile station determines which out of the two modes to operate in, as discussed above. The mobile stations disclosed in the U.S. Pat. No. 5,850,592 can operate at two different power levels. When there are no other available cluster heads, a mobile station operates as a cluster head, and transmits at a relatively high power level for communication among other cluster head stations. Although a cluster head communicates at a higher power level with other cluster heads, a cluster head can still communicate with its cluster members using a relatively lower power level.

Nodes in ad-hoc networks employ known routing techniques to accomplish their routing requirements. For example, "link-state" routing is one well-known routing mechanism. In a link-state routing system, each router preferably maintains a link-state database. The database maintains a picture, or dynamic map, of the network including various connections, members, components, etc. Routers generate forwarding or routing tables to direct routing traffic through the network based on information contained in the database. Each router (and/or endpoint) preferably generates updates to the link-state database. An update can contain information regarding a router's neighbors, potential neighbors, link metric data (e.g., node congestion, etc.), affiliated nodes, network conditions, partition information, etc. A known "flooding" procedure can be used to distribute (e.g., flood) these updates throughout the network. One known flooding algorithm is discussed in Chapter 5 of "Routing in Communications Networks," M. Steenstrup, ed., 1995. Of course, there are many other known flooding procedures.

One example of a link-state routing approach is discussed in U.S. Pat. No. 6,028,857, issued to R. Poor on Feb. 22, 2000, and assigned to the Massachusetts Institute of Technology. According to the U.S. Pat. No. 6,028,857, in a "link-state" routing approach, each network node maintains a routing table (or database) that specifies an "optimal" path toward each network destination. In the U.S. Pat. No. 6,028,857, the term "optimal" is used to generally mean the shortest path, but may account for other factors such as load balancing. As will be appreciated by those skilled in the art, a shortest-path calculation can be performed via a shortest-path first algorithm, for example, Dijkstra's algorithm as explained in Chapter 5 of "Routing in Communications Networks," M. Steenstrup, ed., 1995.

As discussed in the U.S. Pat. No. 6,028,857, when a node in a link-state routing system transmits a message to a destination node, it first fetches from a routing table an entry for the specified destination. The routing table entry specifies which neighbor of an originating node should relay the message and the identification of that neighbor is installed in a message header as the recipient. The originating node then transmits the message. Many of the originating node's nearby neighbors receive the message, since radio frequency ("RF") transmissions are essentially omni-directional. However, of all the neighbors that receive the transmission, only the specified recipient acts on the message. The recipient relays the message in the same manner, according to an entry in its routing table corresponding to the destination node. This process continues until the message reaches its ultimate destination.

The nodes discussed in the U.S. Pat. No. 6,028,857 do not, however, maintain these types of routing tables, but rather maintain "cost tables" that indicate the costs of transmission to other nodes in the network, i.e., a number of hops on the routing-path and traffic involving the node.

As will also be understood by those skilled in the art, there are many other known procedures for routing messages over a network, even when a configuration of the network may change, and many procedures for measuring or rating the connectivity of a network in a particular configuration, all of which are well known in the art. Because these techniques are known in the art, they will not now be described in further detail. However, reference may be had to the following technical articles: "Packet Radio Routing," by Gregory S. Lauer in Chapter 11 of "Routing in Communication Networks," ed. Martha E. Steenstrup, Prentice-Hall 1995; "Packet Radio Network Routing Algorithms: A Survey," by J. Hahn and D. Stolle, IEEE Communications Magazine, Vol. 22, No. 11, November 1984, pp. 41–47; "The Organization of Computer Resources into a Packet Radio Network," by R. E. Kahn, IEEE Trans. on Communications, Vol. COM-25, No. 1, January 1977, pp. 169–178; "Analysis of Routing Strategies for Packet Radio Networks," J. Garcia Luna Aceves and N. Shacham, Proc. of the IEEE INFOCOM '85, Washington, D.C., March 1985, 292–302; and "The DARPA Packet Radio Network Protocols," by J. Jubin and J. Tornow, Proc. of the IEEE, Vol. 75, No. 1, January 1987, pp. 21–32. See also U.S. Pat. Nos. 4,718,002, 5,243,592, 5,850,592, 5,881,246, 5,913,921 and 6,028,857 for the general state of the art in wireless network message routing.

The mobility of an ad-hoc network necessarily implies reliance on a portable power source, such as a battery. Ad-hoc networks in particular are energy-conscious as they are often used for emergency or military applications. One problem that exists with such mobile networks is that it is difficult to determine the amount of energy required to transmit a packet between two nodes, without actually attempting to transmit the packet multiple times to find an "optimal" transmission power level.

In ad-hoc networks, conserving the battery's limited power is of particular concern since a node will often be required to route packets for other nodes. Recently, wireless modems and/or transceivers, such as Aironet's 4800 PCM/CIA cards, have emerged with the capability to vary their transmission power. Since a transceiver can use a large part of the total power of the mobile node, it is advantageous to reduce the amount of power used for each transmission. However, a problem exists in that the transmitter usually does not know a priori what power is required to "close the link" (e.g., successfully transmit a packet from a first node to a second node). Conventional military radios typically try to first transmit at a low power, then repeatedly attempt higher power levels upon a failure to transmit. Subsequent transmission failures remove any advantage of eventually finding the optimal transmission power, since the battery drain is significant. The effects of multiple transmission attempts are particularly evident in mobile systems where link qualities, such as signal-to-noise ratios, change over time. Conventional off-the-shelf radios are typically even simpler in design, and typically do not provide any power adaptation.

These types of problems are not adequately addressed in the art. Thus, there is a need to identify an optimal power level to transmit messages to a node in an ad-hoc network. There is also a need for a network routing scheme based on optimal power paths. There is a further need for a network that employs energy-conserving routing techniques.

SUMMARY OF INVENTION

The present invention relates generally to a mechanism for performing energy-based routing in communications networks.

According to a first aspect of the invention, a communications node is provided in a network including a plurality of nodes. The communications node includes a transceiver to transmit and receive messages. The communications node has at least one communications link with a first node of the plurality of nodes. The communications node includes an electronic memory circuit having network information stored therein, and an electronic processor circuit. The electronic processor circuit: (i) determines path loss information across the at least one communications link by evaluating power data corresponding to a message received from the first node; (ii) distributes the path loss information to the network; and (iii) routes messages to the network based on path loss information.

According to another aspect of the invention, a method of conserving energy in a wireless ad-hoc network is provided. The network includes a plurality of communication nodes, with each node including a transmitter and receiver. The network also has a plurality of communication links between the nodes. The method includes the steps of: (i) determining energy attenuation data for messages transmitted over the links; (ii) distributing the energy attenuation data to the communication nodes; and (iii) determining a network routing path including a lowest energy path and routing a message via the lowest energy path.

According to still another aspect, a method of estimating instantaneous minimum transmission power to close a link in a wireless network between a first node and a second node of a plurality of communication nodes is provided. Each of the nodes includes transmitting means and receiving means. The method includes the steps of: (i) monitoring, by the first node, transmission signals transmitted from at least the second node in the network; (ii) filtering energy information corresponding to the transmission signal using a linear predictive filter; and (iii) outputting from the linear predictive filter a signal corresponding to a transmission energy requirement.

Computer executable code stored on a computer readable medium is provided according to yet another aspect of the present invention. The code is to operate a communications router in a communications network. The network includes a plurality of communication routers and a plurality of communications links. The code includes: (i) code to determine energy information associated with at least some of the plurality of communication links; (ii) code to distribute the energy information to at least some of the communication routers; and (iii) code to determine a network routing path having a lowest energy based at least in part on the energy information.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

The preferred embodiments will be described with respect to a wireless communications node (specifically a "router") and to an ad-hoc network formed by at least a plurality of similar wireless nodes. However, the present invention is not limited to only wireless ad-hoc networks, and may be applied to other networks as well.

In mobile, multi-hop wireless networks some nodes preferably act as packet routers, which can relay packets to other nodes in the network. Typically, infrastructure such as base stations or wired backbones are not required in such networks. As will be appreciated by those skilled in the art, in such ad-hoc networks, nodes discover each other, determine how to relay packets throughout the network, and maintain paths (e.g., "routes") through the network as communication links between nodes fluctuate, disappear and reappear as the nodes move. These networks are particularly useful for communication applications requiring quick and inexpensive systems, without the use of a fixed infrastructure.

Figure 1A:
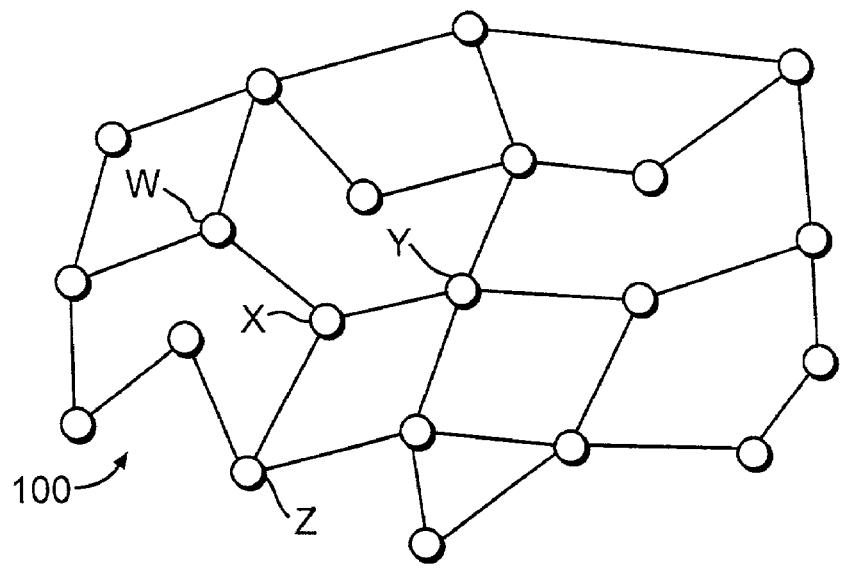
FIG. 1A is a diagram of an ad-hoc network.
Figure 1B:
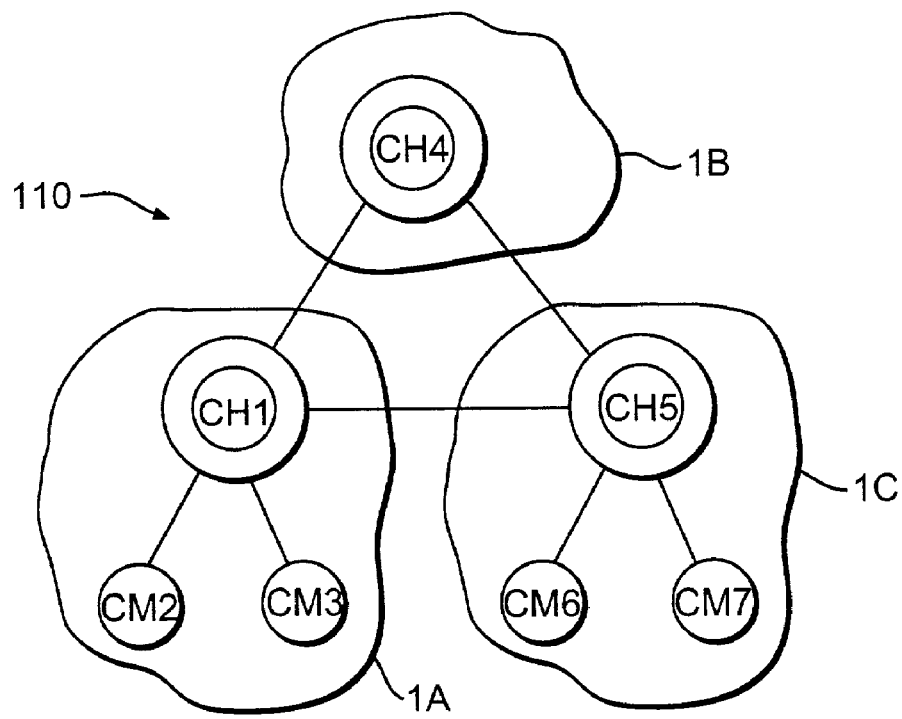
FIG. 1B is a diagram of an ad-hoc network in which member nodes are arranged in clusters.
Figure 2:
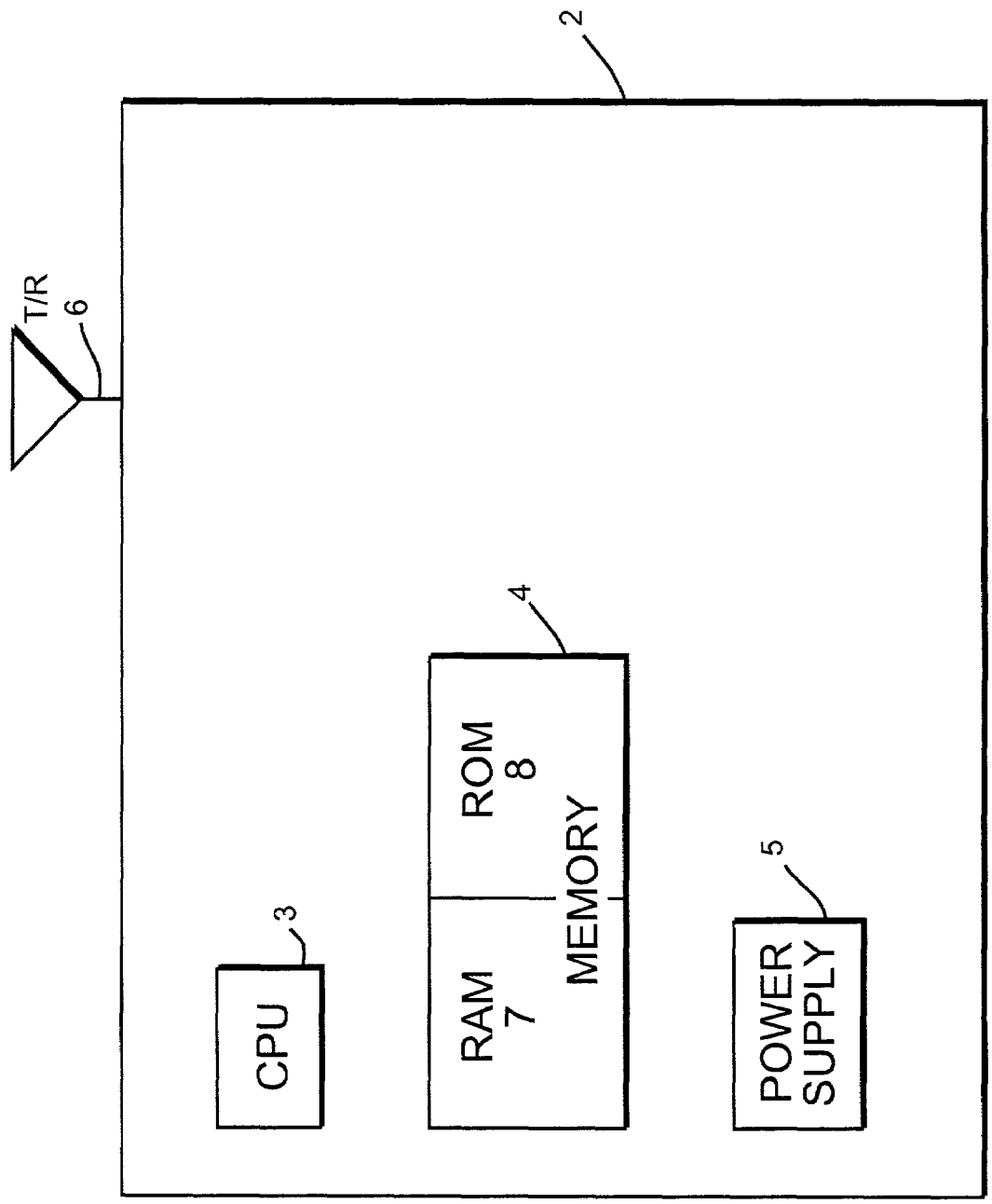
FIG. 2 is a block diagram of a wireless communications router.

A wireless communications router 2 is shown in FIG. 2. The wireless router 2 preferably includes at least one central processing unit (CPU or other electronic processor circuit) 3, a memory (or an electronic memory circuit) 4, a power supply 5, a transceiver 6 (e.g., a transmitter and a receiver), RAM 7 and/or ROM 8. The memory 4, RAM 7 and ROM 8 are each suitable for storing computer executable software, data structures, data bases and/or for storing various network routing tables, for example. The transceiver 6 facilitates the transmission and reception of signals (e.g., RF, infrared signals, etc.) in a known manner. As will be appreciated by those skilled in the art, many conventional transceivers provide a Received Signal Strength Indication (RSSI), and such transceivers may be employed in the present invention. For example, such transceivers typically include an auto gain control ("AGC") chip, or the like, that provides an RSSI voltage signal. The RSSI voltage signals are typically converted to digital values for use by resident software through known digital processing methods. An RSSI is preferably proportional to the power of the received packet (e.g., "RcvdPwr").

As will be appreciated by those skilled in the art, the CPU 3 executes computer executable software in a known manner. As such, the CPU 3 controls the operation of the wireless router 2 and implements the software, methods, procedures and logic of the present invention. The wireless router 2 may include more than one transmitter and/or more than one receiver. Of course, the wireless router can include other known signal processing and measurement components, data entry devices, routing and protocol software and modules, as well as other known communication and computing components. The wireless router 2 can also include an Ethernet interface, as well as other interfacing ports, such as serial ports (e.g., RS-232 or RS-423 interfaces) and USB ports. With these arrangements, the wireless router 2 communicates with other wireless routers in a network. Of course, other known routing architectures may also be used with the present invention.

Nodes in ad-hoc networks preferably transmit beacons or other messages such as neighbor discovery broadcasts. These transmissions are preferably performed at a network known, highest power level and are periodically sent to notify other network nodes of an issuing node's existence. Nodes that are not part of the network may hear these beacons and attach to the network, and nodes already in the network can be notified of a nearby node's presence from "overhearing" (e.g., receiving) the beacons.

Figure 3:
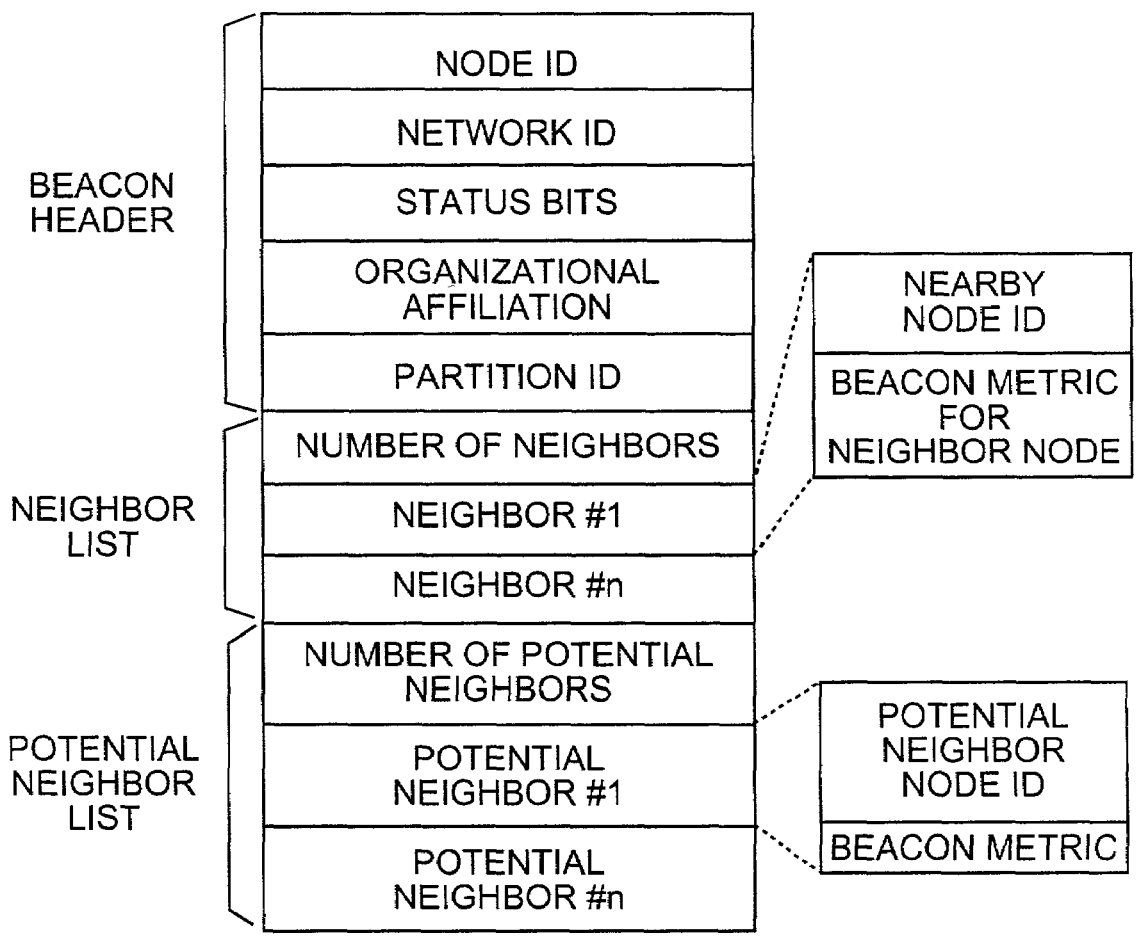
FIG. 3 is a diagram illustrating a format of a beacon message.

An example beacon format is shown in FIG. 3. The format preferably includes a beacon header, a neighbor list, and a potential neighbor list. The beacon header may include a unique node ID, a network ID, a status field, organizational affiliation, a partition ID, or the like. The neighbor list preferably includes information regarding neighboring nodes, or those nodes with which the issuing node has an established neighbor or communications relationship. The neighbor list may also include an ID and a metric for each identified neighbor. The neighbor list fields are not required to effectively implement the present invention.

A metric expresses or measures how "expensive" it is to transmit across one link. Typically, a metric is calculated at the transmitting side of the link. For example, if a link exists between nodes A and B, the metric for a link from A to B is the sum of the expense of being processed at node A and the expense of being transmitted from node A to node B. Other factors for determining a metric for a link may include queuing delays at a node, congestion through a node, statistical delay probabilities and/or corruption caused by interference or disruption of a signal, and so forth.

Returning to FIG. 3, the potential neighbor list identifies a number of potential neighbors. A potential neighbor is a node within an issuing node's transmission range that could be used for forwarding messages, but which is not currently being so used. For each identified potential neighbor, the potential neighbor list may include an ID and a metric (or other quality factor) associated with that node. Of course, the potential neighbor fields are not required to effectively implement the present invention.

These beacons are used to determine (or estimate) a path loss between an issuing node and a receiving node. Path loss can be defined as an amount of attenuation (or loss) that occurs to a radio transmission when attempting to transmit cross a communications link. Since these beacons are sent out at the network known, highest power level, a receiving node can determine (or estimate) the path loss across a link. For example, a node can subtract the highest power level amount from the amount of power received to estimate or determine path loss. This path loss can then be used to determine a minimum power level needed to transmit a message back to the issuing or transmitting node. For example, in one arrangement, path loss over a link is considered to be symmetrical. Accordingly, the path loss for a transmission from node A to node B is used as the path loss for a transmission from node B to node A. In another arrangement, the measured path loss for a transmission from node A and node B, plus a hedge factor (e.g., a value representing additional system loss), is used to model the path loss for a transmission from node B to node A. In either arrangement, path loss is preferably proportional to the minimal amount of power needed for transmission of a packet back to the issuing node.

Other factors may also be considered when determining the energy associated with a packet and the corresponding path loss. For example, transmitter gains, receiver gains and/or other gains associated with transmitting signals can be considered. In one embodiment, received power (RcvdPwr$_{act}$) is expressed as follows (where powers are expressed in decibels in relation to milliwatts (dBm) and gains and path loss are expressed in decibels (dB)):

$$RcvdPwr_{act} = TxPwr_{act} + TxAntGain + RxAntGain - Path\ loss + FECGain.$$

The path loss over a link can be determined from this expression, since the other equation variables are either known, measured or can be derived. Typically, RcvdPwr$_{act}$ is derived from data provided from the transceiver. For example, RcvdPwr$_{act}$ can be proportional to the RSSI of a received packet. In the above equation, FECGain represents a forward error correction gain, TxAntGain and RxAntGain represent, respectively, transmitting and receiving antenna gains, and TxPwr$_{act}$ represents the transmission power level. Using such forward error correction can actually reduce the required transmission power levels since some errors associated with power attenuation can be corrected through the FEC coding. In one example, when simulating or modeling such a received power expression, TxAntGain can be set to 0, RxAntGain can be set to 0, and TxPwr$_{act}$ can be set to 23 dBm. Of course, other values can be selected to model specific equipment or system characteristics.

Power information from a received packet (e.g., RSSI or received power data) is preferably used to determine a minimal amount of power needed to send a packet back to a transmitting node. To make such a determination, a receiving node preferably uses information regarding the power level that was used to transmit the packet (e.g., "TxPwr"). Combining the received power data and the transmission power level allows the receiving node to determine a minimal amount of power (or corresponding power level) required to send packets back to the transmitting node. This minimal amount of power (e.g., TxPwr) is preferably proportional to the path loss, and may include additional factors to represent receiver sensitivity, antenna gains, and so forth.

The receiving node can then use energy information (e.g., path loss and/or a minimum power transmission level) to make network-wide decisions to find the most energy efficient route available through the network. For example, a path with a lower overall energy expenditure can be selected to route messages through the network. The receiving node can also distribute (or "flood") the energy information of this link throughout the network. Such distribution techniques are well known in the art and are commonly used, for example, in "link state" or "distance vector" systems. Network nodes preferably maintain a database (or other data structure) to track path loss and/or energy power levels in the network. Nodes can then construct forwarding tables or designate optimum routes between given nodes based on the supplied energy information. In this manner, all network nodes can participate in energy-conserving routing.

Figure 4:
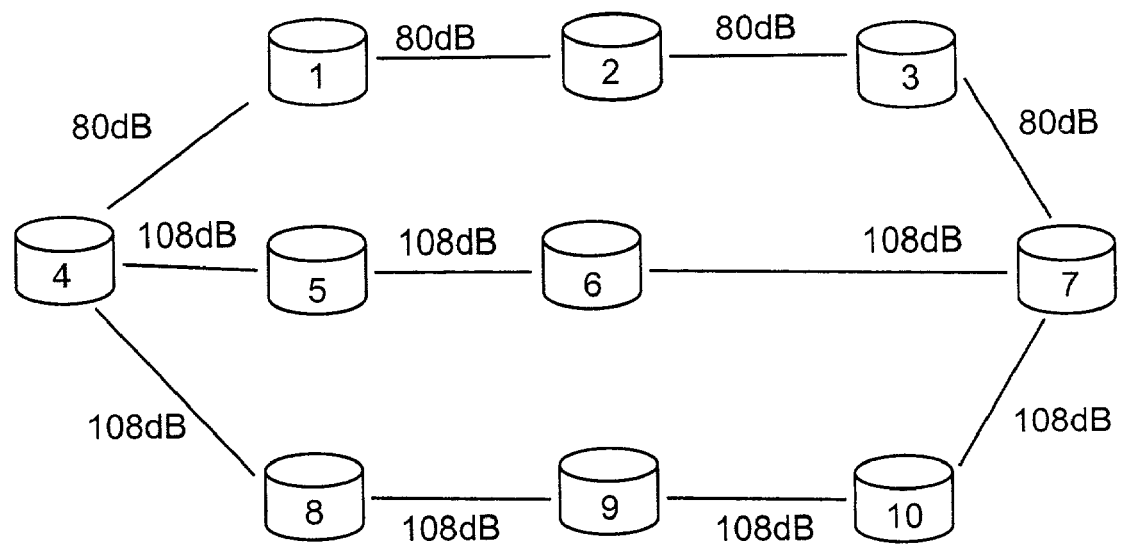
FIG. 4 is a diagram of a network having path loss data assigned to communication links.

FIG. 4 illustrates an ad-hoc network including nodes 1–10. Path loss values are noted on illustrated communication links between the nodes in FIG. 4. For example, the direct path loss between node 4 and node 1 is 80 dB. The solid lines between the illustrated nodes designate communication links (e.g., designate that a transmission is possible between the linked nodes). The path loss between some nodes might be large enough so as to prevent communications. For example, the path loss between nodes 6 and 9 might be 300 dB or another high value so as to prevent direct communication between the nodes.

Figure 5:
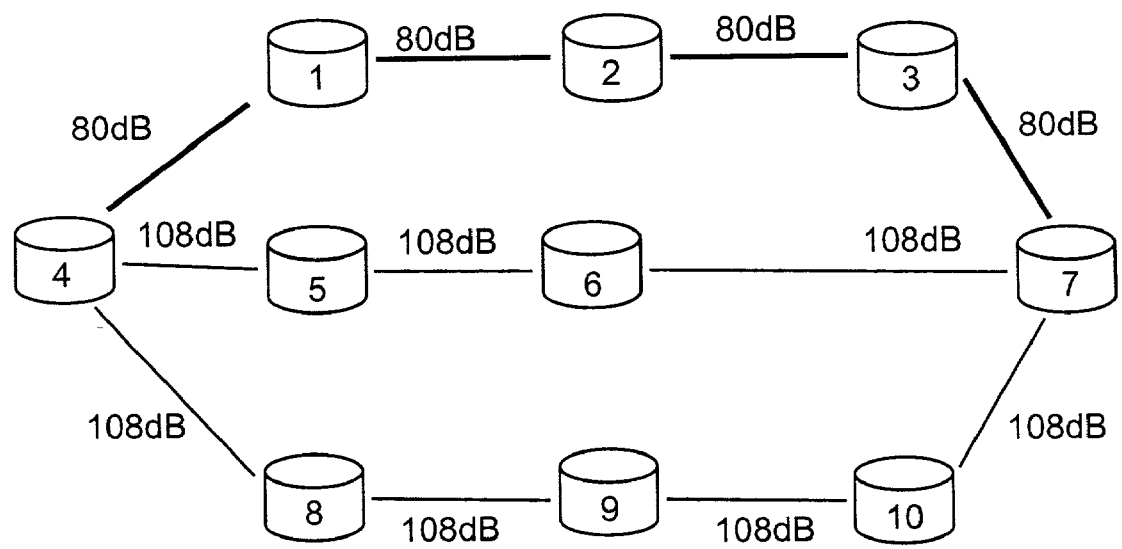
FIG. 5 is a diagram that illustrates an energy-conserving path for the network of FIG. 4.

Three transmission routes between node 4 and node 7 are illustrated in the FIG. 5 example. A first route (4-8-9-10-7) has a combined path loss of 432 dB (e.g., 108 dB+108 dB+108 dB+108 dB). A second path (4-5-6-7) has a combined path loss of 324 dB, and a third path (4-1-2-3-7) has a combined path loss of 320 dB. To conserve overall network energy, routing of a packet from node 4 to node 7 preferably occurs over the third path (i.e., 4-1-2-3-7), as illustrated in heavy lines in FIG. 5. In this regard, the third path is not necessarily the "shortest" route (e.g., is not the route with the fewest hops). The shortest route between node 4 and node 7 is the second path (i.e., 4-5-6-7). Nevertheless, the third route has a lower overall energy requirement and is preferably selected as the minimum energy path.

Figure 6:
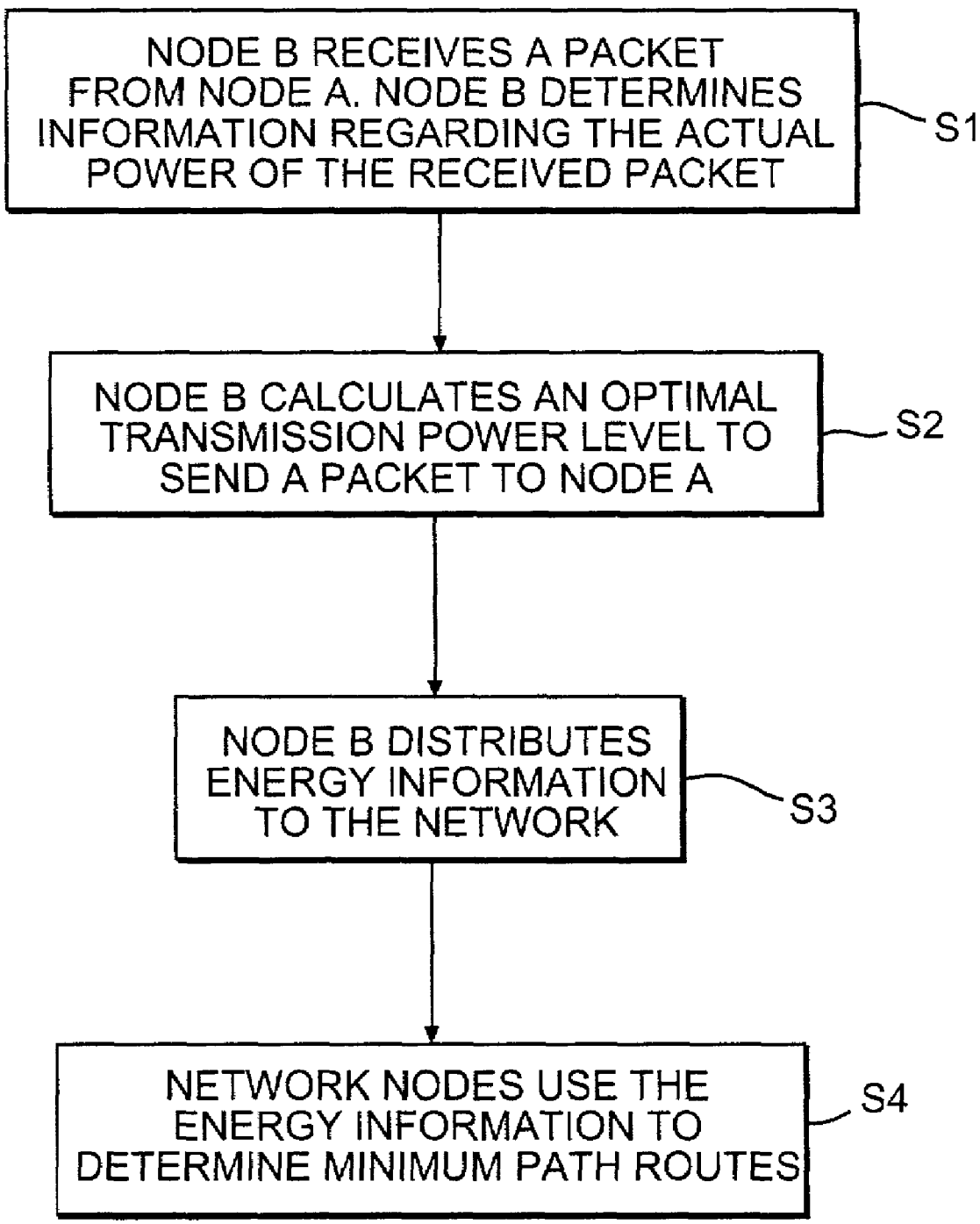
FIG. 6 is a flow diagram for an energy-conserving routing procedure.

The flow chart illustrated in FIG. 6 details an energy conserving routing approach. In step S1, a node B receives a packet from a transmitting node A. Node B preferably determines information regarding the actual power received (RcvPwr$_{act}$) for this particular packet in decibels in relation to milliwatts (e.g., 10 log(x/1 mW). As discussed, RcvPwr$_{act}$ is preferably derived from a RSSI provided by Node B's transceiver. For example, RcvPwr$_{act}$ may be proportional to the RSSI.

In step S2, node B calculates an optimal (e.g., a minimum) transmission power level ("TxPwr$_{min}$") to send a packet to node A, preferably in accordance with the following relationship:

$$TxPwr_{min} = RcvPwr_{req} - RcvPwr_{act} + TxPwr_{act},$$

where:
  i. RcvPwr$_{act}$ is the actual power received for this particular packet, as determined from data provided by node B's transceiver;
  ii. TxPwr$_{act}$ is the power used by node A to transmit the packet (e.g., a network known "highest" power level);

iii. $RcvPwr_{req}$ is the minimal required power required in order to close the link, plus a hedge margin (such data is often known based on the capabilities of the network transceivers); and iv. $TxPwr_{min}$ is the calculated minimal power required by the node in order to close the link with the sending node, which may be adjusted by a margin or other hedge factor.

A relationship between the received power ($RcvPwr_{act}$) and the transmitted power ($TxPwr_{act}$) is preferably expressed as follows:

$$RcvPwr_{act}=TxPwr_{act}+TxAntGain+RcvAntGain-Pathloss.$$

Figure 8:
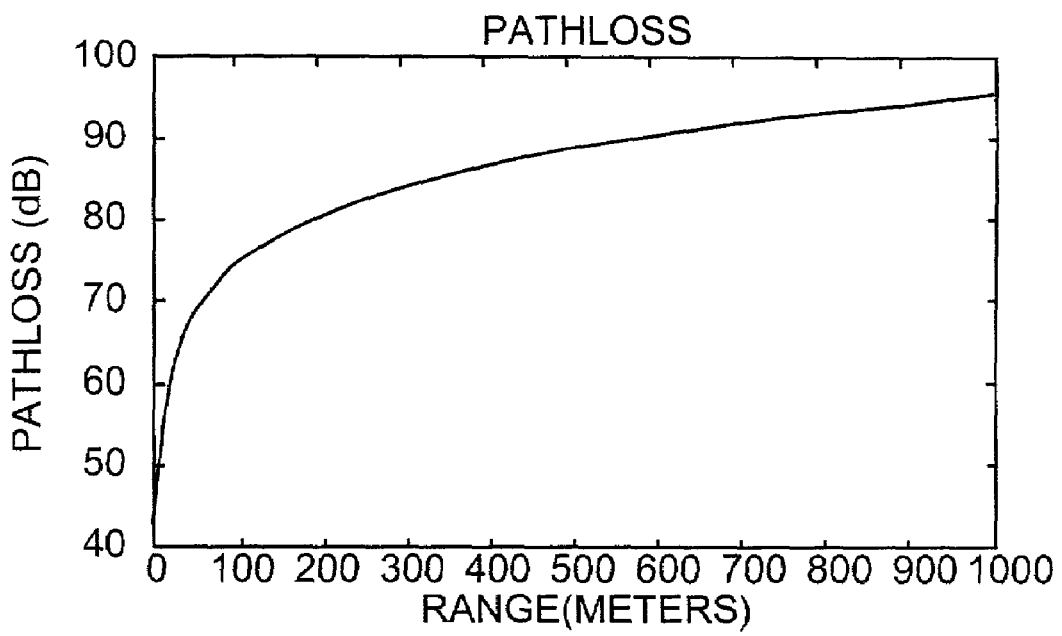
FIG. 8 is a graph illustrating path loss with respect to distance.

The antenna gains (TxAntGain and RcvAntGain) are typically fixed and are known by the receiving node. Alternatively, this information can be transmitted with a packet. Therefore, the relationship between receive power and transmit power is a function of the path loss. As discussed above, this expression may also include additional gains, such as an FECGain. A graph indicating a typical path loss (e.g., dB) with respect to range (e.g., meters) is illustrated in FIG. 8. The transmission frequency in FIG. 8 is 900 MHz. Of course, transmissions can occur at other frequencies as well.

In step S3, node B distributes (e.g., floods) energy information to the network in a known manner. For example, node B can distribute a minimum transmission power level ("$TxPwr_{min}$") to the other network nodes. Node B can also distribute other energy information, such as path loss data, node A's power level information, which of node B's neighbors has an optimum power communications link, and so forth.

In step S4, network nodes use the distributed energy information, together with energy information regarding other network links, to create or determine minimum path routes for use in energy conservation routing. For example, a node can construct routing trees between itself and other network nodes to reflect optimum energy routes. Network nodes can use known algorithms, such as Dijkstra's algorithm, to construct such routes. Network nodes can then maintain data structures, e.g., next-hop or complete forwarding tables, to reflect optimum energy conserving routes. Nodes can also determine which next-hop neighbors should be used to conserve energy when routing messages.

An alternative embodiment of the present invention includes the use of extra power level bits in transmission of each packet. For example, a beacon message or other signal (e.g., data packets) could be appended with an additional power field. A transmitting node then uses a variable amount of power for its transmission, and announces how much power it is using for each packet by including data to identify the variable power level in the extra power level bits. A receiving node could then use this power level data, along with a received signal strength indication (or data derived from the RSSI), to determine an optimal power level to send a packet to the original transmitter. The same equations as were used in step S2 above can be used to model this optimum power level, with $Txpwr_{act}$ representing the variable power level. This alternative embodiment allows the required responding transmission energy to be calculated for each received packet. One tradeoff with this embodiment, however, is that transmissions require a small amount of additional overhead, since each packet contains the variable power data.

Figure 7:
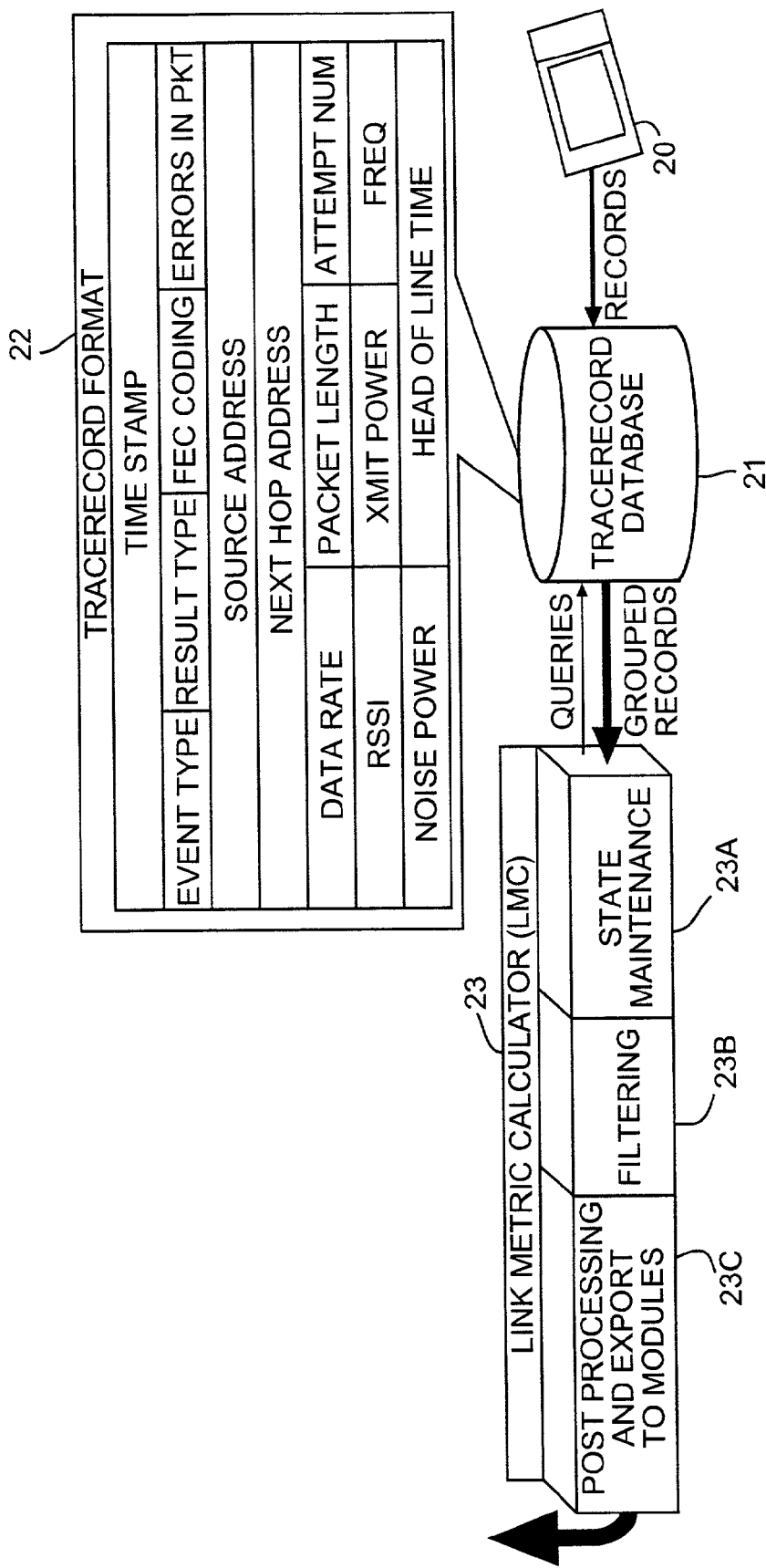
FIG. 7 is a diagram illustrating trace record management and filter processing.

FIG. 7 illustrates a transceiver 20, trace record database 21, trace record format 22, and link metric calculator 23, which may optionally be included in a network node. The transceiver 20 (and/or information contained in a received packet) provides information to the trace record database. The database organizes trace record information, for example, as shown by the trace record format 22. Such information may include a time stamp of the packet, event type (e.g., receive packet, transmit packet), result type (e.g., transmit success, queue full, receive CRC fail), a source and next-hop address, data transmission rate, packet length, a number of transmission attempts, RSSI, a power level for the transmitted packet, transmission frequency, noise power and head-of-line time. The head-of-line time represents the amount of time the packet spends at a head of a queue, which may indicate a delay across a link. The preferable implementation of a communications node treats trace records as "opaque" data from the perspective of networking layer software code. For example, the link metric calculator 23 retrieves records and accesses parts of the trace records, by using standard library calls which use a predefined common set of names, but internally use specially written code for particular trace records. In this way, a radio driver can provide specific capabilities (e.g., radio characteristics, parameters, etc.) in trace records and the network layer software code does not have to be modified for every different radio.

The link metric calculator 23 can access grouped records. As will be appreciated, a link metric calculator is a module (or software application) that periodically harvests data contained in the trace records. The trace records are similar to typical database entries and will often be maintained and accessed through a device driver. The link metric calculator preferably summarizes data so to maintain an understanding of physical parameters. The calculator 23 preferably includes a state maintenance module 23a for maintaining long term information, such as link state, last communication information and so forth, a filtering module 23b, and a post processing and exporting module 23c. The post-processing module performs filtering, such as to filter events deemed to be significant. The filtering module 23b may include a linear predictive filter (hereinafter "LPF") that predicts a minimum power requirement. Such a LPF may alternatively reside outside of the link metric calculator 23.

As will be appreciated, mobile ad-hoc networks are often in a state of flux due to the mobility of their member nodes. Communication links, network configurations and energy and power information (e.g., path loss, required transmission power levels and RSSI) continuously change as the nodes move. Accordingly, a Linear Predictive Filter (LPF) can be used to predict a minimum required transmission power in view of changing characteristics. As will be appreciated by those skilled in the art, LPFs are typically used to predict future outputs based on past inputs, for example, as discussed in Chapters 6 and 13 of Adaptive Filter Theory, $3^{rd}$ Edition, Prentice Hall, S. Haykin (1996).

The minimal transmit power required to close a link is preferably used in wireless communications. One method determines a minimum transmit power for point-to-point communications by maintaining a priori knowledge of the minimal transmit power required including "side" information. Side information may include data obtained from "overhearing" packets transmitted between other nodes. For example, node C may overhear a packet transmitted between nodes A and B. The side information is obtained by monitoring communications from a node with a transmitting node providing the actual transmit power used for that particular burst. Monitoring such transmissions provides additional data points to be used in a predictive evaluation. The monitoring node then preferably filters energy data (e.g., path loss, RSSI, and/or received power) using a LPF to predict the minimal transmit power for a particular node. Of course, the use of side information is not a requirement for the present invention. For example, the present invention may also use information of packets transmitted between two nodes exclusively, without the use of overhearing control information. Accordingly, side information is discussed herein only as an example of improved instantiation.

When determining a minimum transmit power using a LPF, the transmit power is preferably provided in all packets transmitted by a node, including all handshake packets (Request to Send (RTS) & Clear to Send (CTS)), as well as data packets, e.g., data and acknowledge packets. This information could also be provided implicitly by known, pre-specified power levels for specific packets (e.g., full power for neighbor discovery beacons.) Also, different models of radios have different transmission specifications (e.g., the radios have transmit and receive antennas with different gains) which can be included in each packet of information. As discussed, transceivers typically provide RSSI data. The transmit power levels, gains, and RSSI can be used to derive or calculate received power levels, path loss, and so forth.

Figure 9:
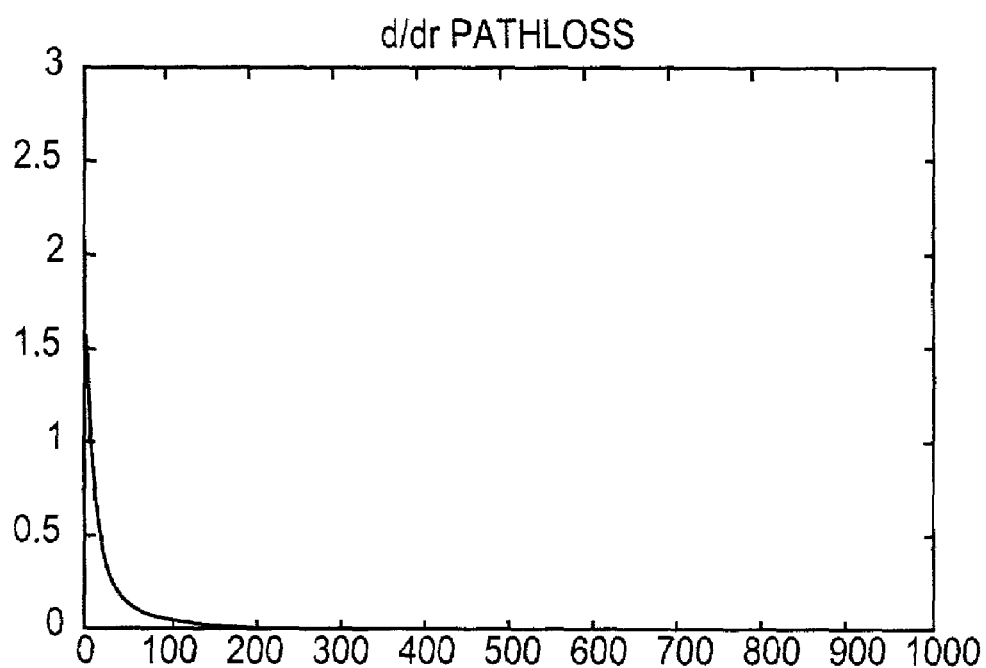
FIG. 9 is a graph illustrating the derivative of the path loss of FIG. 8 with respect to distance.
Figure 10:
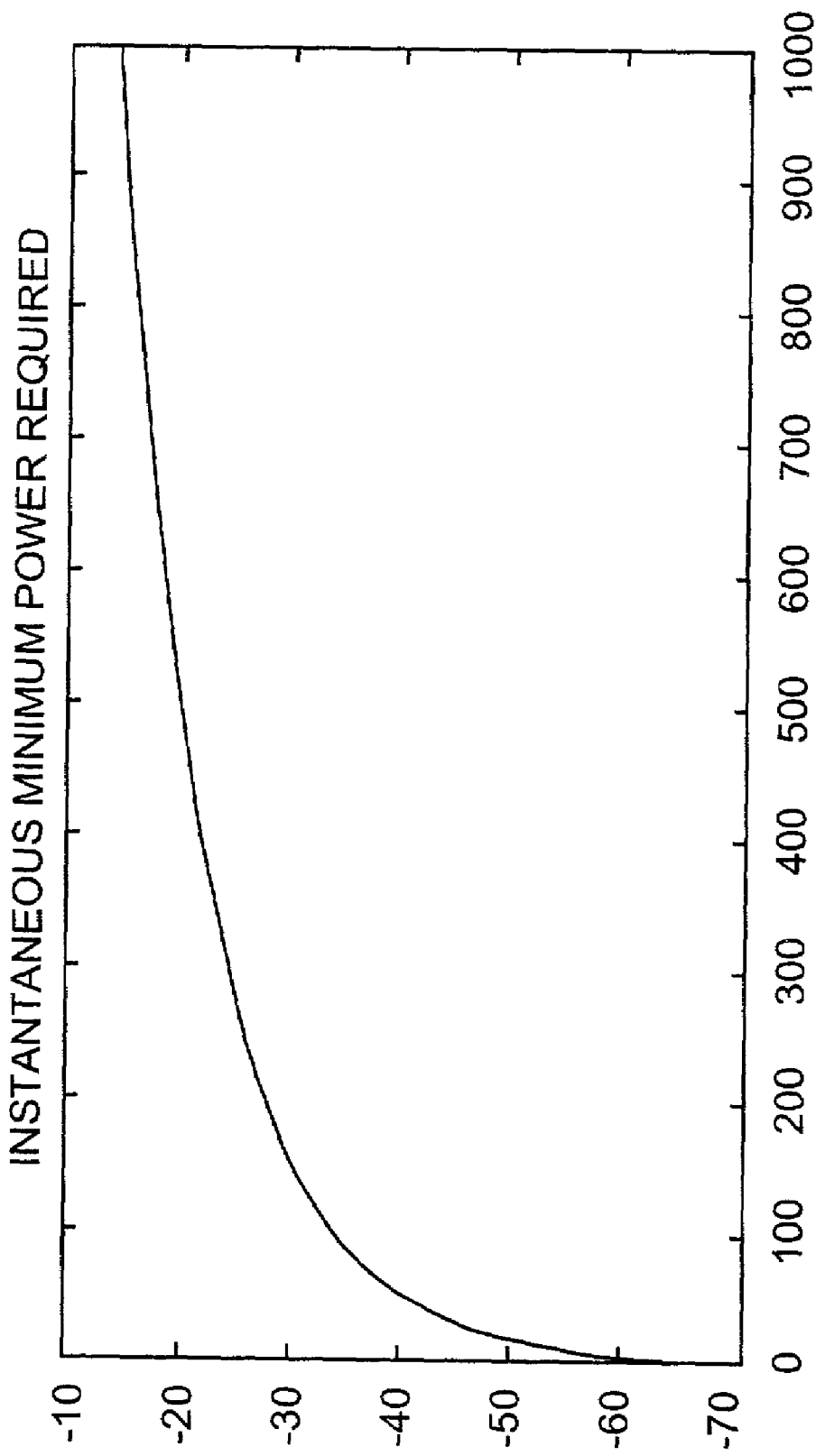
FIG. 10 is a graph illustrating an instantaneous minimal transmission power for a node moving away from a monitoring node.

FIG. 9 is a graph showing the derivative of the path loss with respect to distance (e.g., meters). FIG. 9 illustrates that as distance increases, the change in path loss is fairly small. Therefore, given constant transmit power from the transmitting node, the received power profile takes on the profile of the path loss. The path loss model can then be mapped to a model of the minimal transmit power. The received power profile also can be used to model path loss. For example, FIG. 10 illustrates the calculation of the instantaneous minimal power for a node moving away from the monitoring node. FIGS. 8–10 are illustrated without noise on the signal.

An Auto Regressive (AR) model can be used to determine the instantaneous minimal power. From this model it is determined that a first order, LPF is appropriate to determine system coefficients, as well as to forward predict the minimal power during update periods when no data is available. Of course, a multi-ordered filter, such as a second or third order filter, can also be used for such predictions. LPFs are preferably realized with software. However, as will be appreciated by those skilled in the art, such filters can also be implemented with hardware.

A LPF can be used to predict minimum transmit power for mobile networks, particularly when energy requirements are changing. Such information can be provided to the network to assist with energy based routing.

We developed a simulation in MATLAB to demonstrate the ability of an LPF to determine minimal power estimations in wireless networks. In practice, a network node will not necessarily receive regular periodic inputs (e.g., beacons or packets). Accordingly, random dropouts were simulated to demonstrate that a LPF could forward predict accurately once convergence of the filter had been attained. We used a LPF with a known Recursive Least Squared ("RLS") adaptive signal-processing algorithm to predict the coefficients from an AR model, as well as to forward predict when no input data is available. In practice, input data might not be available because a node's input is based on actual packet transmissions and receptions, and such events can not be guaranteed to occur on a regular basis.

Figure 11:
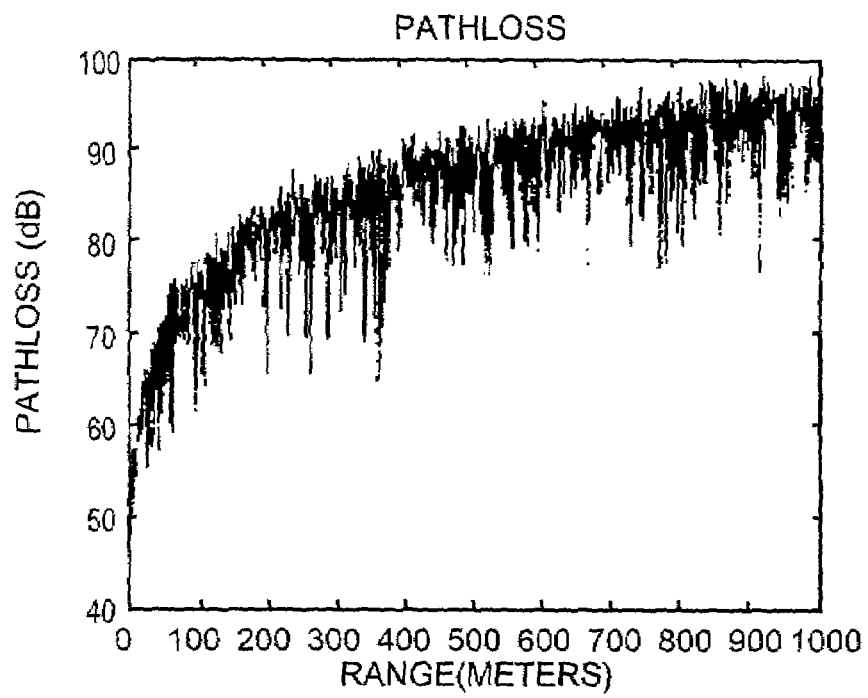
FIG. 11 is a graph illustrating path loss with added noise components.

Also, noise was added to the simulation to better represent real-world constraints. FIG. 11 is a graph that illustrates path loss with added noise with respect to range (e.g., meters). For the simulation, a Gaussian noise with a variance of 0.7 was added to the path loss in order to simulate noise in a wireless system. Accordingly, signal-to-noise ratios on the minimal transmit power of about −3 dB resulted.

Figure 12:
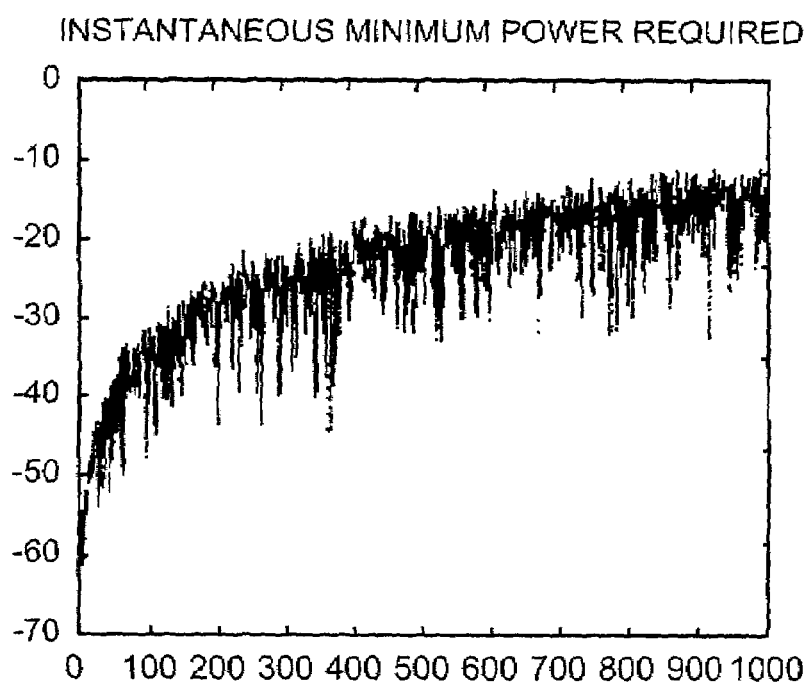
FIG. 12 is a graph illustrating a continuous instantaneous minimal power required for the path loss shown in FIG. 11.

FIG. 12 is a graph that illustrates continuous instantaneous minimal power required for the path loss shown in FIG. 11. The data was generated using the LPF as described above. FIG. 12 is an optimal solution with data received in each sample period.

Figure 13A:
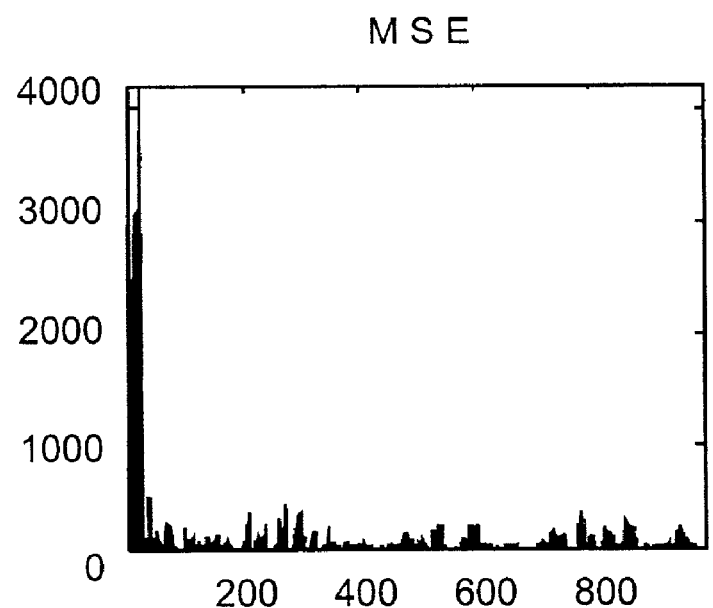
FIGS. 13A–13D are graphs illustrating characteristics of a linear predictive filter over time.
Figure 13B:
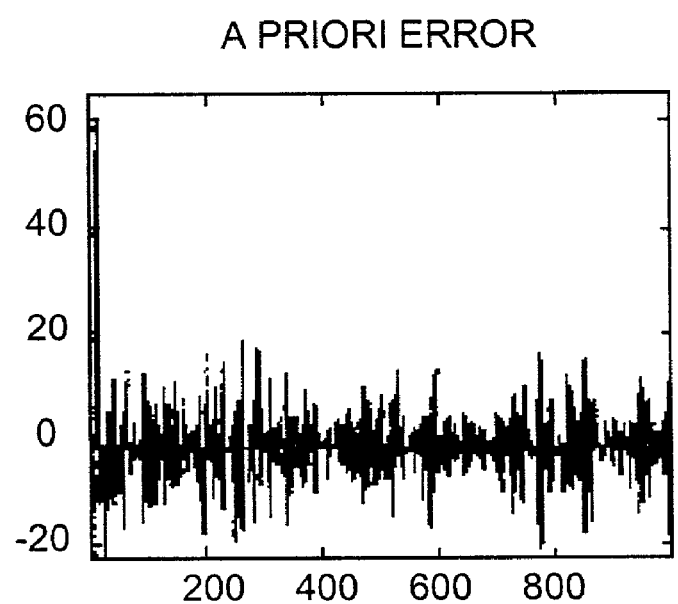
Figure 13C:
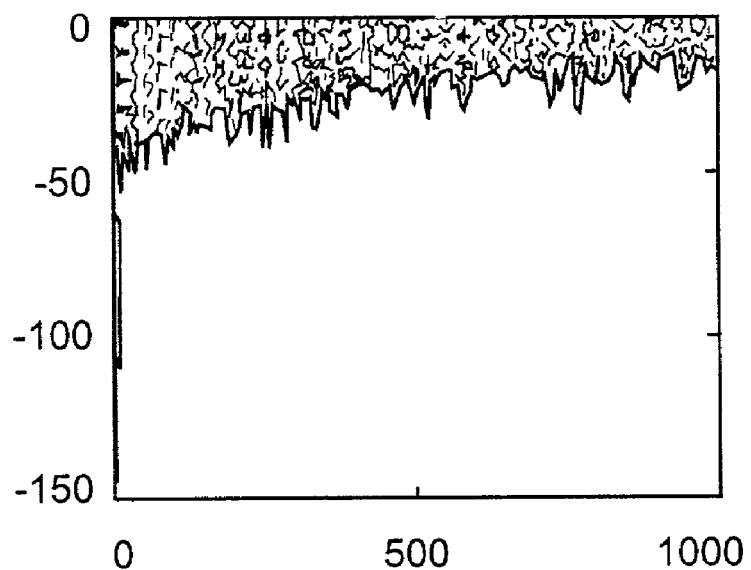
Figure 13D:
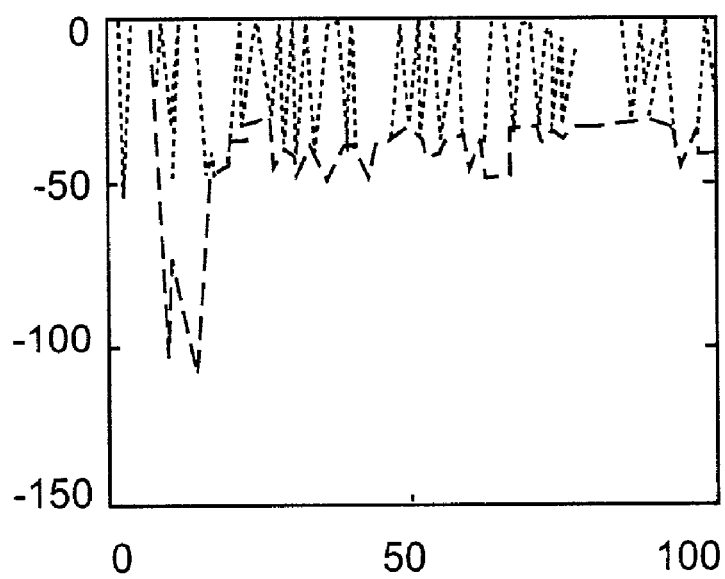

FIGS. 13A–13B are graphs that illustrate characteristics of the LPF over time (in seconds). FIG. 13A is a graph that illustrates the Mean Square Error ("MSE") of the filter. As will be appreciated, the MSE demonstrates the distance from convergence, which is an indicator of how well the filter is performing. FIG. 13B is a graph showing the a priori error, which is the difference between the predicted and actual filter input (e.g., MSE is the square of the a priori error). As shown in FIGS. 13A and 13B, convergence appears on both the MSE and the a priori error charts. FIG. 13C is a graph that illustrates a combination of the input (e.g., energy information such as transmission power, path loss, or so forth) and the output of the filter (e.g., the minimum required transmission power). The input is illustrated as a zero value when there is no input. In the filter, however, the input is set to the output of the filter when there is no data. Sending the output to the input during these times of missing data disables an adaptation algorithm (e.g., the algorithm that assists the filter in predicting the next value based on a previous state). Therefore, the LPF continues to predict the next minimal power when data is not present on the input. FIG. 13D is an expanded view of FIG. 13C, which further demonstrates the characteristics of the LPF filter. In FIG. 13D, the dashed line is the input and the solid line is the filter output. Note that the input goes to zero when input data is not available. When the input is zero, the output of the filter is the forward prediction of the system model.

Figure 14:
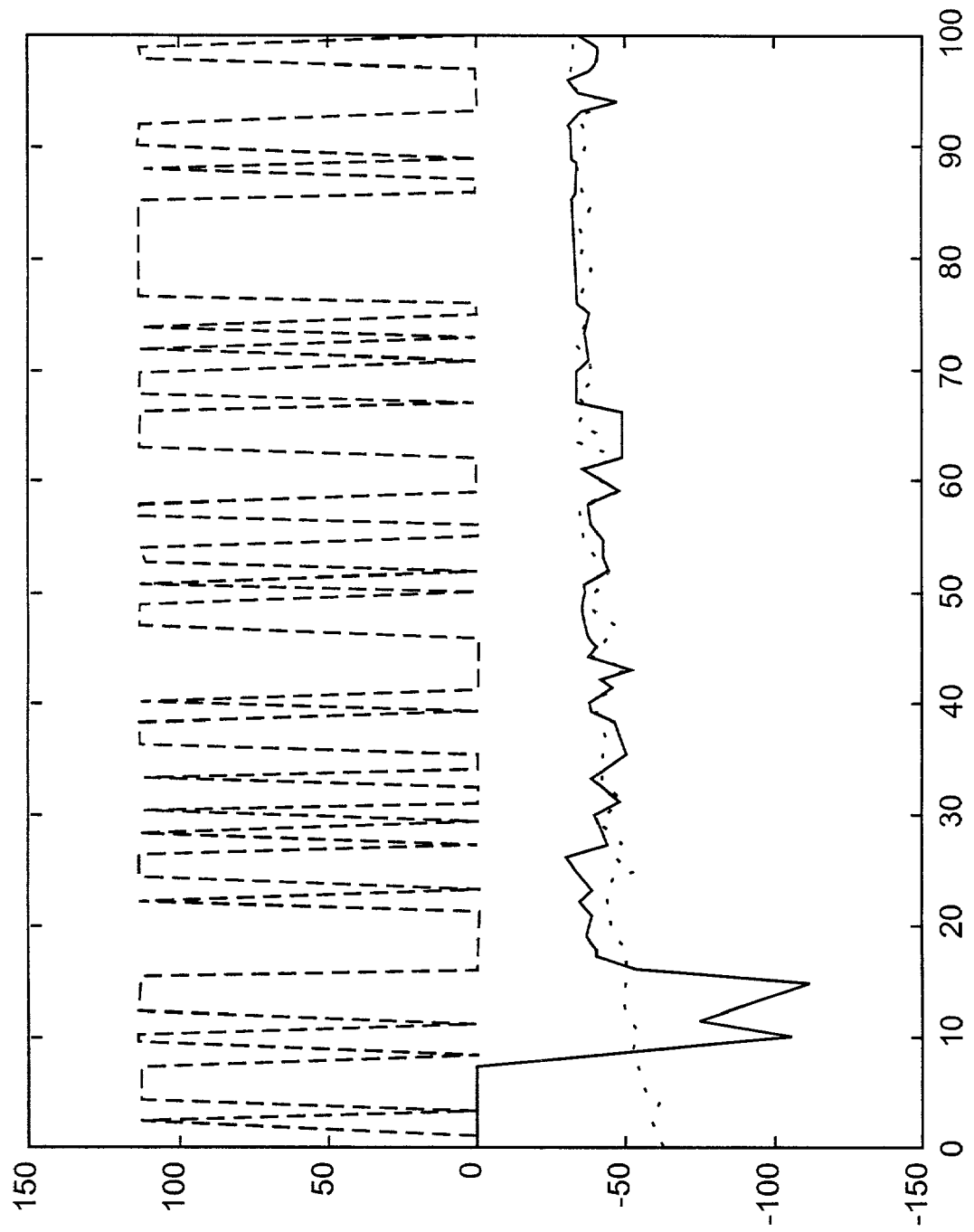
FIG. 14 is a graph illustrating characteristics of the linear predictive filter over time.

FIG. 14 is an even more detailed look at the characteristics of the LPF filter. In FIG. 14, the x-axis represents time in seconds, and the y-axis is measured in units of decibels (dB). The dashed line indicates when data is available and when it is not. When the dashed line is high, data has been dropped (e.g., no input data is available). When the dashed line is low, input data is available. The dotted line represents energy information, such as actual path loss. The dotted line includes the noise in a receiver. The solid line illustrates the output of the filter over time. In this manner, the input to the filter is simulated as seen by arriving packets, using the semi-random dashed line as an indicator of input or no input.

Accordingly, as shown by the solid output line in FIG. 14, a LPF/RLS algorithm can converge, track, and predict the minimal transmit power based on received packet information from a given node. There are three pieces of information that are preferably provided from the filter for such predictions: convergence, tracking performance and forward propagated MSE/a priori error. This information can be used to determine how well the filter is working.

The individual components shown in outline or designated by blocks in the figures are all well known in the communication arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the present invention is not limited by the specific network configurations illustrated with respect to FIGS. 1A, 1B, 4 and 5. Other possible configurations may include a different number of total routers or nodes, different connectivity arrangements, a different number of cluster heads, cluster members and/or affiliation connections, multiple cluster-member to cluster head affiliations, cluster-member to cluster-member messaging, and so forth.

Also, the specific path loss values given with respect to FIGS. 4 and 5 are not intended to limit the present invention. Instead, these values have been provided for illustrative purposes only. Of course, other values may be used to represent actual path loss between nodes. Also, instead of using path loss to determine the lowest energy routes, other energy information could be used. For example, the minimum transmission power level could be used, and a path with the lowest overall transmission power level could be determined.

Furthermore, as will be appreciated by those of ordinary skill in the art, the methods, procedures, data structures, and logic as described herein, can be readily embodied in a programmable computer or in computer executable software using known programming techniques. The software can be stored on a computer readable medium, for example, on a floppy disk, RAM, ROM, a hard disk, removable media, other magnetic memory, flash memory, memory caches, memory sticks, optical mediums, magneto-optical mediums, CD-ROMs, etc.

As will be appreciated by those skilled in the art, the methods and procedures of the present invention not only apply to wireless, ad-hoc networks, but also to traditional base-station dependent networks as well. Routing decisions can be made according to the present invention in order to optimize routing in traditional networks.

Other possible beacon formats can be used in addition to the format illustrated in FIG. 3. For example, in a cluster-based ad-hoc network, the format may include fields to represent affiliated cluster heads and/or cluster members. Also, the format may simply include a node identifier. Of course, these formats are also acceptable. Also, cluster members may be configured to issue periodic beacon messages. As will be appreciated, pass loss data can also be derived from these beacons as well.

An alternative method for determining a minimum transmit power involves a handshake. For example, a transmitter broadcasts to a receiver a short burst that indicates that the transmitter wants to communicate with the receiver. The receiver returns a short burst that indicates how much energy should be used to close the link (based on the received message). The transmitter then transmits the data at the requested minimal power and the receiver returns an acknowledgement at the same power level.

What is claimed is:

1. A communications node in a network including a plurality of nodes, said communications node including a transceiver to transmit and receive messages and having at least one communications link with a first node of the plurality of nodes, said communications node comprising:
an electronic memory circuit having network information stored therein; and
an electronic processor circuit which (i) determines path loss information across the at least one communications link by evaluating power data, including a received signal strength indication (RSSI), corresponding to a message received from the first node, the evaluating including subtracting the RSSI from a predetermined maximum powers; (ii) distributes the path loss information to the network; and (iii) routes messages to the network based on path loss information.

2. A communications node according to claim 1, wherein said electronic processor circuit determines a minimum power level for transmission to the first node.

3. A communications node in a network including a plurality of nodes, said communications node including a transceiver to transmit and receive messages and having at least one communications link with a first node of the plurality of nodes, said communications node comprising:
an electronic memory circuit having network information, including trace records, stored therein; and
an electronic processor circuit which (i) determines path loss information across the at least one communications link by evaluating power data corresponding to a message received from the first node; (ii) distributes the path loss information to the network; and (iii) routes messages to the network based on path loss information.

4. A communications node according to claim 3, wherein said trace records are opaque with respect to said communications node.

5. A communications node according to claim 3, wherein the trace records comprise operating parameters for the transceiver.

6. A communications node according to claim 5, wherein said electronic processor circuit i) accesses the trace records through standardized software library calls via predefined common sets of names; and ii) uses predetermined software for internally manipulating predetermined trace records.

7. A method of operating a communications node in a network including a plurality of nodes, the communications node including a transceiver to transmit and receive messages, the communications node having at least one communications link with a first node of the plurality of nodes, said method comprising the steps of:
determining path loss information across the at least one communications link by evaluating power data, including a received signal strength indication (RSSI), corresponding to a received signal from the first node, wherein the path loss is determined by subtracting the RSSI from a predetermined maximum power;
distributing the oath loss information to the network; and
routing messages to the network based on oath loss information.

8. A method according to claim 7, further comprising the step of determining a minimum power level for transmission to the first node.

9. A method of operating a communications router in an ad-hoc wireless network including a plurality of routers, the method comprising the steps of:
obtaining a received signal strength indicator (RSSI) for a message received from a first router of the plurality of routers;
determining a power level requirement for a message transmission between the communications router and the first router by subtracting the RSSI from a transmission power level of the first router; and
distributing the power level requirement to at least some of the routers in the network.

10. A method according to claim 9, wherein the power level of the first router is a predetermined power level.

11. The method according to claim 9, wherein the power level of the first router is provided in the message from the first router.

12. The method according to claim 9, further comprising the steps of:
   receiving power level requirements from the plurality of network nodes; and
   selecting routing paths based on the power level requirements so as to minimize a network energy expenditure.

13. A method of estimating instantaneous minimum transmission power to close a link in a wireless network between a first node and a second node of a plurality of communication nodes with each node including transmitting means and receiving means, said method comprising the steps of:
   monitoring by the first node, transmission signals from at least the second node in the network;
   filtering energy data corresponding to the transmission signal with a linear predictive filter; and
   outputting from the linear predictive filter a signal corresponding to a transmission energy requirement.

14. A method according to claim 13, wherein the energy data is a received signal strength indicator.

15. A method according to claim 13, wherein the energy data is a received power level.

16. A method according to claim 13, wherein the energy data is path loss data.

17. A method according to claim 13, wherein the energy requirement is a minimal transmit power level to transmit a signal from the first node to the second node.

18. A method according to claim 13, further comprising the step of distributing the energy requirement to the plurality of nodes.

19. A method according to claim 13, wherein the transmission signals monitored by the first node comprise side information.

20. A method according to claim 19, wherein the side information comprises data received from a third node of the plurality of nodes.

21. A communications node for estimating instantaneous minimum transmission power to close a link in a wireless network between said communications node and a first node of a plurality of communication nodes with each node including transmitting means and receiving means, said apparatus comprising:
   means for monitoring transmission signals from at least the first node in the network; and
   means for filtering energy data corresponding to the transmission signal, and for outputting a signal corresponding to a transmission energy requirement.

22. A communications node according to claim 21, wherein the monitored transmission signals comprise side information.

23. A communications node according to claim 22, wherein the side information comprises data received from a second node in the network.

* * * * *

UNITED STATES PATENT AND TRADEMARK OFFICE
CERTIFICATE OF CORRECTION

PATENT NO.    : 6,973,039 B2
DATED         : December 6, 2005
INVENTOR(S)   : Redi et al.

It is certified that error appears in the above-identified patent and that said Letters Patent is hereby corrected as shown below:

<u>Column 13,</u>
Line 67, replace "powers" with -- power --.

Signed and Sealed this

Seventh Day of March, 2006

JON W. DUDAS
*Director of the United States Patent and Trademark Office*